No. 760,090. PATENTED MAY 17, 1904.
H. H. VENABLE.
UNIVERSALLY ADJUSTABLE SAW GUIDE.
APPLICATION FILED APR. 14, 1903.
NO MODEL. 2 SHEETS—SHEET 1.
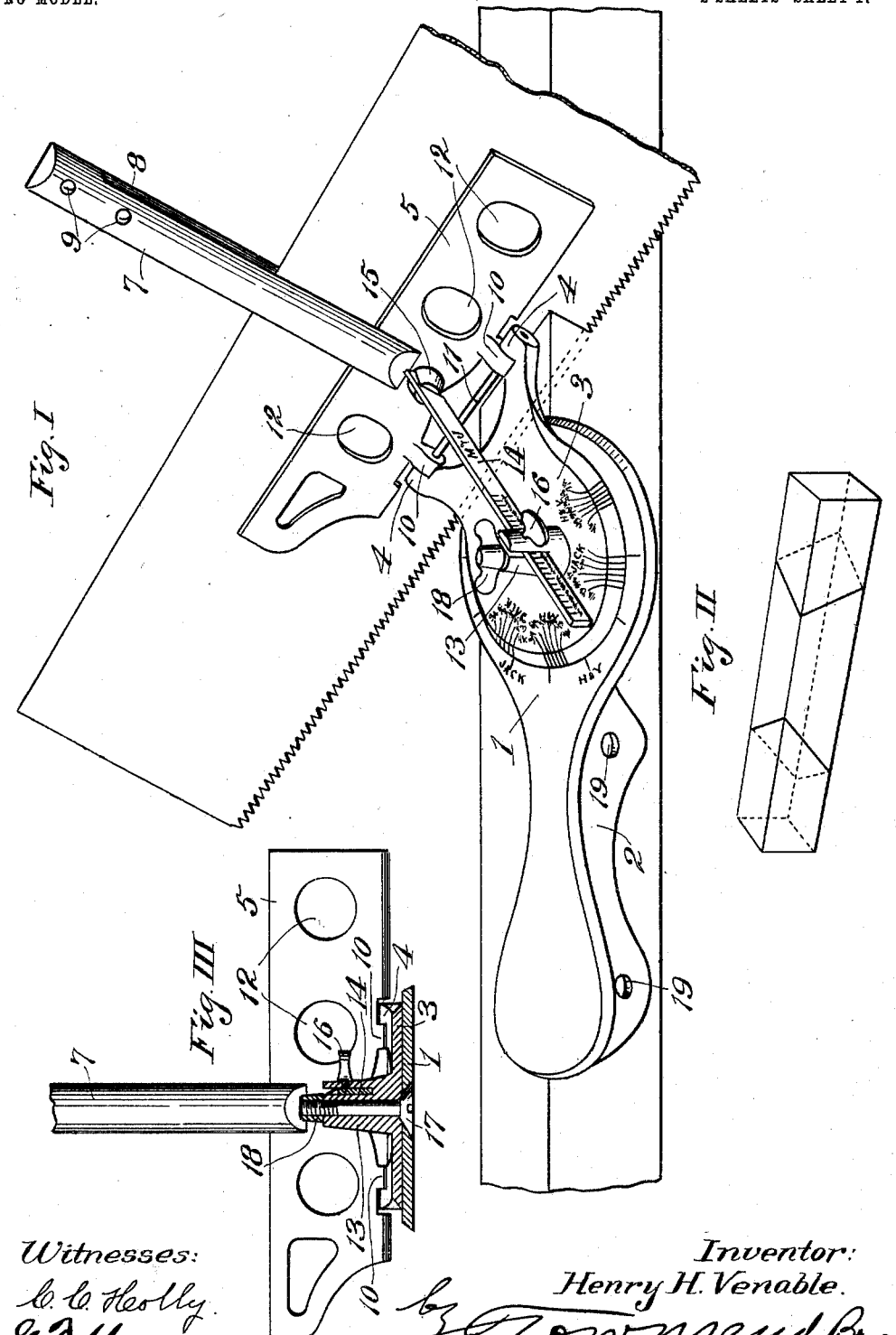
Witnesses:
C. C. Heolly
G. P. Hackley
Inventor:
Henry H. Venable.
by Townsend Bros.
his attys.

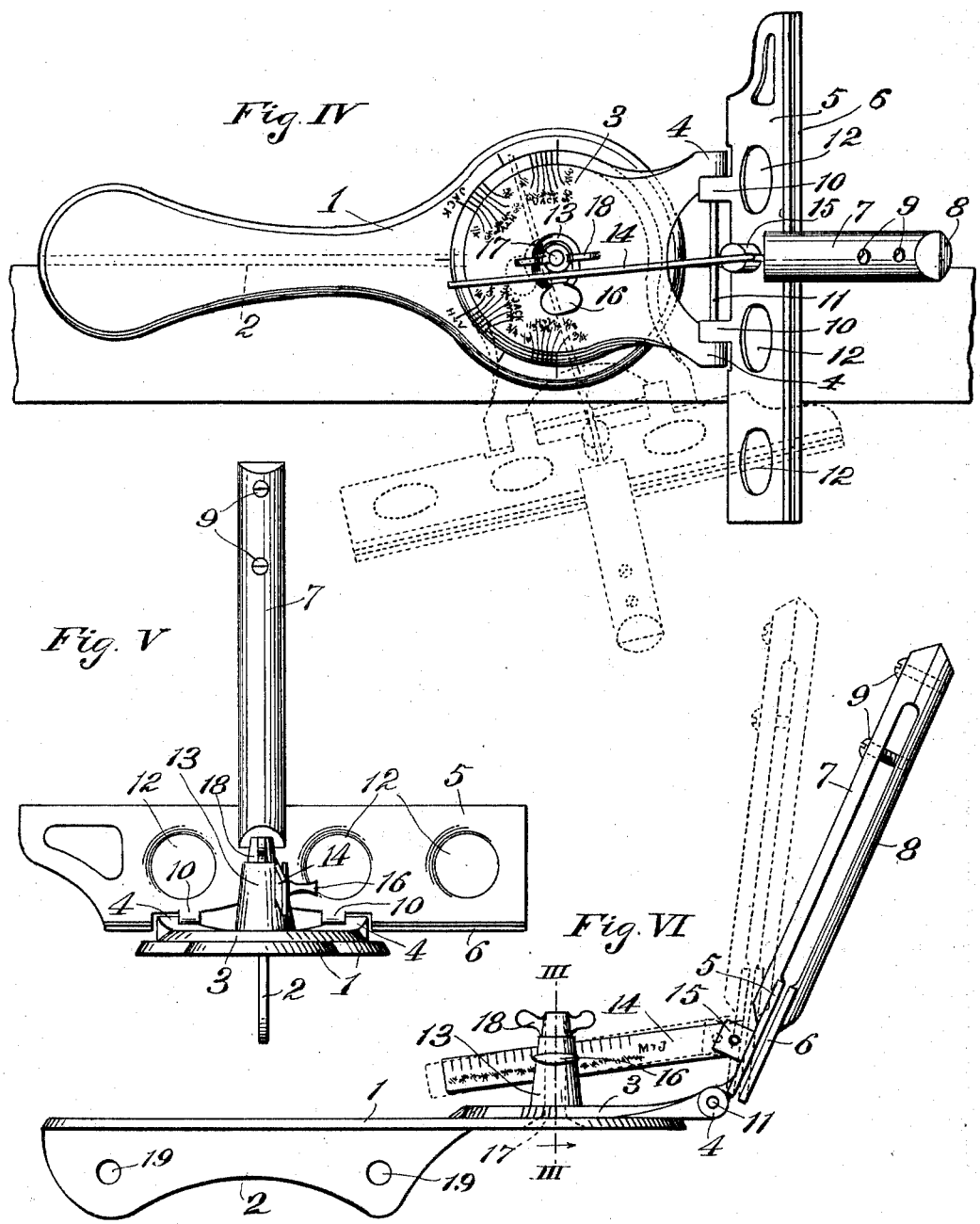

No. 760,090. Patented May 17, 1904.

UNITED STATES PATENT OFFICE.

HENRY H. VENABLE, OF LOS ANGELES, CALIFORNIA.

UNIVERSALLY-ADJUSTABLE SAW-GUIDE.

SPECIFICATION forming part of Letters Patent No. 760,090, dated May 17, 1904.

Application filed April 14, 1903. Serial No. 152,617. (No model.)

*To all whom it may concern:*

Be it known that I, HENRY H. VENABLE, a citizen of the United States, residing at Los Angeles, in the county of Los Angeles and State of California, have invented a new and useful Universally-Adjustable Saw-Guide, of which the following is a specification.

My invention relates to a device which may be held upon a piece of wood to be sawed and which is provided with means for guiding the saw. The saw-guiding means is adjustable universally, so that the plane of the cut may be both at an angle to the top face and also at an angle to the side face of the block being sawed. In cutting the end of a rafter which stands at an angle to the horizontal and which is to meet and join with two other rafters which also meet at an angle it has heretofore been necessary to mark or scratch at least two faces of the piece for a guide to saw to. In fact, in cutting any piece which must have two or more joining faces of different angles it is very difficult to properly fashion the piece. Moreover, even after a piece has been properly marked it requires great skill on the part of the joiner to accurately guide the saw true to the marks.

The object of the present invention is to reduce the above-mentioned difficulties and provide a device which may be set to guide the saw either straight through the timber—*i. e.*, through a plane perpendicular to the running-faces thereof—or at any angle or "double angle" required and which will guide the saw true to the desired plane of cut.

The device may be provided with marks or graduations to indicate definitely the exact point at which to set parts of the device, so that even in the hands of an unskilled joiner the device positively insures accurate cutting.

Another object is to provide a device of the character described which is so constructed that it may be readily manipulated with one hand and held in position against the piece being sawed by one hand, so as to leave the other hand of the joiner free to operate the saw.

Another object is to provide a device of this character which is adapted to work through an extremely-wide angle—that is to say, more than ninety degrees—so as to enable bevels to be cut on each side of the perpendicular to the timber in either direction.

When one set of timbers has been fashioned, the device may be set for cutting other angles in sawing other sets of timbers, and so on, which makes the device a very valuable tool for use by carpenters, joiners, cabinet-makers, &c.

Other objects of my invention are to produce a device of the character described which is very simple in construction, of few parts, which are capable of quick and accurate adjustment and which will retain their position when adjusted, and which is of economical construction and of great efficiency and durability.

Referring to the drawings, Figure I is a perspective view showing the device applied to a timber. A portion of the saw-blade is shown in connection therewith, and the timber is shown as having been partially sawed. Fig. II is a perspective of the timber, illustrating diagrammatically various cuts which may be secured by the aid of the device. Fig. III is a vertical section on line III III, Fig. I. Fig. IV is a plan view of the device, showing the saw-holder tilted from the vertical, and dotted lines indicate the saw-holder having been tilted at angle to the axis of the supporting member. Fig. V is a side view looking from the end of the handle toward the saw-holder. Fig. VI is a side elevation.

The invention comprises, essentially, a saw-holder and means for supporting the same adapted to be placed in contact with or in a definite position relative to the timber being sawed, with means for adjusting the saw-holder universally and clamping the same.

1 designates a supporting member formed of a flat plate, one end of which is preferably in the shape of a flat handle, the other end being formed disk-like. Projecting from the lower face and forming part of the supporting member 1 is a flange 2, which extends directly along the center line or axis of the supporting member 1 and terminates near the disk-like portion.

3 designates a swivel-head which is provided with lugs 4. The swivel-head 3 is revoluble on the disk portion of the supporting member 1 and may be clamped when at any desired angle to the supporting member by means hereinafter described.

The swivel-head 3 carries a saw-holder which may comprise means for guiding the saw in a perfect plane without any unnecessary friction existing between the saw and the saw-holder. Preferably the saw-holder may consist of opposite guide-plates 5 and 6, to which are attached arms 7 and 8, which serve to support and guide the back of a back-saw (when a cross-cut is used the back will be supported by plates 5 and 6 only) and which also causes the plates to be held in such a way that one plate is yieldingly pressed against the saw-blade. The two arms 7 and 8 may be fastened together by screws 9. The arms 7 and 8 while stiff will spring sufficiently to allow movement of the saw-blade without undue friction.

By adjusting the screw 9 the desired amount of pressure between the plates 5 and 6 and the saw-blade may be secured. By loosening the lower screw 9 the plates 5 and 6 may be sprung apart to accommodate a thick saw, and if a back-saw or other saw is used with a thin blade the lower screw 9 may be adjusted to draw the plates 5 and 6 closer together. The plate 5 is provided with lugs 10, which are perforated and register with the lugs 4, while a pintle 11 may pass through all four lugs, thus hinging the saw-holder to the swivel-head. The plates 5 and 6 may have openings 12, which will relieve the friction between the saw and plates without materially reducing the stiffness of the plates.

Projecting upwardly from the center of the swivel-head 3 is a post 13, which preferably may be cast together with the swivel-head. The post 13 at one side is slotted down for some distance to receive a reach-bar 14, the latter being pivoted to a lug 15, which projects from the plate 5.

16 is a thumb-screw in the post 13 for tightening the reach-bar 14. The center of the post 13 is hollow, and 17 is a post, the lower end of which is enlarged, which passes through the hollow post 13 and has it upper end threaded to carry a thumb-screw 18.

The post 13 being vertical and the swinging movement of the saw-holder being also vertical, I am enabled to make the point of attachment of the reach-bar to the post approximately in the plane of movement of the point of attachment of the saw-holder. As a consequence the thrust of the saw-holder on the point of attachment to the post is direct and is not liable to lead to excessive strain, as would result when the reach-bar is compelled to assume an acute angle with the saw-holder. Moreover, this construction enables the saw-holder to be swung on either side of the vertical with equal ease of adjustment and with equal directness of strain transmission. By the term "vertical" is meant perpendicular to the plane of the supporting member 1, this direction being vertical in the ordinary use of the device.

The lower face of the supporting member 1 is countersunk to receive the head of the post 17. The flange 2 is provided with screw-holes 19, which allows the device to be screwed to a bench when desired.

In use the supporting member is placed against the piece to be sawed with the lower face of the supporting member resting upon the top face of the timber to be sawed, while the flange 2 is pressed flat against the side of the timber to be sawed. This trues up the supporting member and insures that the supporting member will be arranged parallel with the running-faces of the timber. The saw-holder having been adjusted at the proper angle, the saw is inserted so that its blade lies within the plates 5 and 6 with the back of the saw lying free or out of contact with the arms 7 and 8. The saw is then operated and as it cuts through the timber it is guided in its reciprocation, as well as in its movement downward as it cuts, by the plates 5 and 6. The space between the arms 7 and 8 should preferably be sufficient to receive the back of a back-saw, in case such a saw should be used, which might be the case in sawing molding or smaller timber. If it is desired to saw squarely across the timber, the saw-holder is swung into a vertical position, or rather a position perpendicular to the face of the supporting member 1, and the thumb-screw 16 then tightened. The thumb-screw 18 is loosened to allow the swivel-head 3 to be swung into a position such that the plates 5 and 6 will lie at exactly right angles to the flange 2, after which the thumb-screw 18 may be tightened.

The swivel-head 3 and disk portion of the supporting member 1 may be provided with suitable graduations, as shown, so that any desired adjustment of the saw-holder may be secured.

The saw-holder may be swung with respect to the swivel-head through nearly one hundred and eighty degrees, while the swivel-head 3 may be adjusted to swing the saw-holder through much more than one hundred and eighty degrees. In fact, ninety degrees of adjustment would be sufficient, although the fact that the saw-holder can be swung to either side of the flange 2 is a valuable feature, as it allows for the device to be placed against the timber with the flange on either side of the timber.

It is obvious that various changes may be made in the herein-described embodiment without departing from the spirit of the invention. The reach-bar 14 should also be provided with marks or graduations, as shown, so that the saw-holder may be set at any determined angle from the vertical.

The graduations on the supporting member and swivel-head may be fractional subdivisions of the general or main divisions which indicate the points at which to set the parts for sawing rafters—for instance, "H & V," "Jack," "M & H" may each be subdivided, as $\frac{1}{8}, \frac{1}{4}, \frac{1}{2}, \frac{5}{8}, \frac{3}{4}$, &c.

What I claim is—

1. A supporting member comprising a flat plate, a flange projecting from said plate at right angles to the plane of said plate, a swivel-head revolubly mounted on said flat plate, a hollow post on said swivel-head, a vertical post passing though said flat plate swivel-head, and hollow post, a screw device on said post for binding together the swivel-head and supporting member, a saw-holder hinged to the swivel-head, a reach-bar pivoted to said saw-holder, and means for clamping said reach-bar to said hollow post.

2. A supporting member comprising a flat plate, a flange projecting from said plate at right angles to the plane of said plate, a swivel-head revolubly mounted on said flat plate, a hollow post on the swivel-head, a post extending through the flat plate, swivel-head and hollow post provided with screw means for binding said parts together, and the hollow post having a slot, a saw-holder hinged to the swivel-head, a reach-bar pivoted to the saw-holder and extending through said slot, and a clamping-screw for binding said reach-bar in the slot.

3. A supporting member comprising a flat plate provided with a flange projecting at right angles therefrom, a swivel-head revolubly mounted on said flat plate and having a slotted post, means for binding the swivel-head to the flat plate, a saw-holder hinged to the swivel-head, and a reach-bar pivoted to the saw-holder and extending through the slot in said post, and a clamping means for binding the reach-bar in the slotted post.

4. A supporting member, a swivel-head, a hollow post on the swivel-head, a threaded post passing through said member and said hollow post, a thumb-nut on said threaded post above said hollow post, a saw-holder hinged to said swivel-head, a reach-bar connected to said saw-holder, and means for clamping said reach-bar to said hollow post.

5. A supporting member, a swivel-head, a hollow post projecting upwardly on said swivel-head, a threaded post passing through said supporting member and the hollow post, a thumb-nut above said hollow post on said threaded post, said hollow post being slotted, a saw-holder hinged to said swivel-head, a reach-bar pivoted to said saw-holder and passing through the slot in said hollow post, and a screw through said hollow post clamping said reach-bar.

In testimony whereof I have signed my name to this specification, in the presence of two subscribing witnesses, at Los Angeles, in the county of Los Angeles and State of California, this 3d day of April, 1903.

HENRY H. VENABLE.

Witnesses:
GEORGE T. HACKLEY,
JULIA TOWNSEND.